Patented Mar. 15, 1938

2,111,418

UNITED STATES PATENT OFFICE 2,111,418

METHOD OF MANUFACTURING PLASTIC ARTICLES FROM PULVERULENT OR GRANULAR MASSES

Bertold Buxbaum, Berlin-Charlottenburg, Germany, assignor to General Electric Company, a corporation of New York No Drawing. Application March 28, 1935, Serial No 13,583. In Germany March 28, 1934

2 Claims. (Cl. 18—55)

The present invention relates to an improved method of manufacturing plastic articles from pulverulent or granular masses, and is more particularly concerned with an improved method of compacting a pulverulent or granular mass of resinous material.

The manufacture of plastic articles from pulverulent or granular masses in most cases is effected by subjecting the respective mass to pressure, partly with the aid of applied heat. Articles of the kind in view are such, for instance, as artificial resin, artificial amber, artificial meerschaum, building stones manufactured from granular materials with or without an addition of binding material and with or without a special curing, for instance, chalky sand stone, as well as briquets, explosives, and so forth. The usual method of making the articles concerned necessitates in most cases the employment of heavy presses, as the pulverulent or granular masses can be so much compressed that they form solid, coherent bodies only by using an extraordinarily high pressure. The plants for the manufacture of such pressed objects are, therefore, very expensive both to install and to operate.

I am aware of the fact that in some cases certain articles have been produced by ramming or casting, but these methods suffer from the drawbacks that one succeeds only rarely in obtaining a mass with a completely homogeneous structure, and that, where ramming is used, even a tolerably proper union can be obtained only with the aid of a comparatively high pressure.

It is an object of the present invention to provide an improved method of compacting pulverulent or granular masses of plastic materials such as resins and the like, whereby the use of heavy presses heretofore in common use for such purpose is partly or wholly eliminated, manufacturing operations are simplified and a considerable reduction in manufacturing costs is effected. Furthermore, the improved method also aims at obtaining a materially more intimate union of the individual particles of the pulverulent or granular substances within the article produced.

In accordance with the present invention a pulverulent or granular mass is shaken in a mould, the shape of which corresponds to the shape of the article to be made, with a rate of vibration or frequency which corresponds to the natural vibration or natural frequency of the mass, or of the mould with the mass therein. When the natural vibration or frequency has been reached, the mass collapses suddenly in itself, whereby a texture is obtained that cannot be had with such a density and uniformity by pressing, ramming or the like.

In carrying the present invention into effect an auxiliary oscillation or vibration system is used, the Hertz number of which can be gradually increased up to resonance with the natural vibration of the mass, or of the aggregate formed by the mould and the mass. This auxiliary oscillation or vibration system is brought into any comparatively close relation to the respective mass or to the mould with that mass therein. The auxiliary oscillation or vibration system is, for instance, arranged below or upon or at the side of the mould in such a manner that when said system is oscillating or vibrating the mould with the mass therein also oscillates or vibrates. When the oscillation has reached a frequency, the Hertz-number of which corresponds with the natural frequency Hertz-number of the aggregate constituted by the mass and the mould, then a resonance takes place by reason of which said aggregate also vibrates with that same Hertz-number. Thereupon the mass collapses suddenly in itself and represents the plastic article to be made.

The frequency required to attain the natural frequency number is, however, materially higher than that, for instance, with mould shaking machines and lies at about 100 Hertz and thereabove. It is a matter of course that not the natural frequency number of the individual granules of the mass is concerned, but it is the natural frequency number of the entire mass, or of the mass and the mould together, which must be considered.

As the auxiliary oscillation system any one of the known oscillation impulse machines or any other suitable device may be used, for instance a simple crank eccentric, a curve drive with spring, a driving device operating with unequalized centrifugal masses, an electrodynamic or an electromagnetic driving device, or the like.

Prior to the shaking operation the mass may be pre-worked in any known manner, for instance by thorough mixing of the constituents or by adding a suitable cementing agent, or by adding such substances as may be required for obtaining a desired degree of porosity, or by adding a substance suitable for the attainment of a certain degree of hardness, and the like.

The manufacture of the plastic articles can take place also in a continuous manner, in that the moulds with the mass therein may be conducted over an impulse-producing device by means of a continuously running conveyer band, the Hertz-number of the impulse-producing device being accurately tuned to the moulds with the mass therein. While the moulds with the mass therein are conducted over the impulse-producing device the moulds are caused to oscillate with their natural frequency, in consequence whereof the sudden compression of the mass takes place by collapsing in itself. As this compression is extraordinarily intense, it is possible to obtain with certain objects to be manufactured a further reduction of the manufacturing cost and a further simplification of the manufacturing procedure by omitting the cementing agents and the like, which otherwise are necessary when making use of the pressing procedure; with briquets, for instance, the tar, bitumen and the like can be saved. The compacted, plastic bodies produced by means of the present improved method can, if desired, be subjected to any one of the usual afterworkings.

The moulds provided with the mass are preferably covered with a lid or the like in order to prevent the mass from spilling out of the moulds when these are subjected to the action of the high number of oscillations. The moulds themselves need not be nearly so strong as when the articles are manufactured by pressing; they may have thin walls, because they need not stand a high pressure. There is thus obtained the possibility of producing moulds in a cheap manner by simply making casts from patterns in plastic material or in light metal. Besides, quicker working is rendered possible, for example by means of a plurality of moulds arranged above one another in such a manner that the lower portion of an upper mould extends into the upper portion of a lower mould. The upper part of the mould is preferably so designed as to be able to fit into the lower part so that the upper part can follow in vertical direction when the mass in the lower part collapses.

Concerning such masses to which heat must be applied, a heating device resembling that used in connection with presses can be provided. Furthermore, as regards those masses the texture of which changes during the compression procedure, especially those which must be subjected to pressure for a longer time, they may be shaken by means of a device which may be manually or automatically adjusted to provide, with respect to the state of the mass in the moulds, an empirically ascertained frequency number.

For certain purposes it may be desirable to combine a pressing and a shaking phase with one another in such a manner that the mass is first pressed preliminarily, then subjected to the shaking procedure with the application of the natural frequency number, and is finally kept under pressure for a certain longer period of time. The manner of operating and the succession of the procedures must be accommodated, of course, to the kind of the mass and to the sort of the bodies to be made. The pressure can be maintained for the period required, for instance, by means of a weight.

The practical utilization of the intuition that granulated masses subjected to oscillations collapse suddenly in themselves and get an extraordinarily dense texture when their natural frequency number is attained constitutes a definite advance in the art of manufacturing plastic articles from pulverulent and granular masses.

What I claim as new and desire to secure by Letters Patent of the United States is:

1. In making an article of manufacture formed of resinous material, the step of compacting a pulverulent or granular mass of such material by oscillating the mass at its natural frequency of vibration.

2. In making an article of manufacture formed of resinous material, the steps of placing a pulverulent or granular mass of such material in a mold and oscillating the mold with the mass therein at the natural frequency of vibration of the aggregate formed by the mass and the mold, thereby compacting the mass within the mold.

BERTOLD BUXBAUM.